Patented Oct. 19, 1943

2,332,433

UNITED STATES PATENT OFFICE 2,332,433

MEROCYANINE DYE CONTAINING A SELENOCARBONYL GROUP

Leslie G. S. Brooker and Robert H. Sprague, Rochester, N. Y., assignors to Eastman Kodak Company, Rochester, N. Y., a corporation of New Jersey No Drawing. Application August 9, 1941, Serial No. 406,180

21 Claims. (Cl. 260—240)

This invention relates to merocyanine dyes containing a selenocarbonyl group and to a process for preparing such dyes.

A known group of dyes, which belong to the class which has been named merocyanine dyes, are characterized by the following formula:

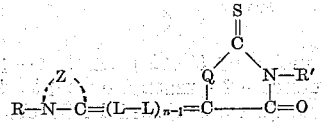

wherein $n$ represents a positive integer of from 1 to 2, L represents a methine group, Q represents a member selected from the group consisting of sulfur, alkylimino and arylimino groups, R and R' each represents an alkyl group (e. g. methyl, ethyl, n-butyl, isoamyl, benzyl, allyl, β-ethoxyethyl) or an aryl group, and Z represents the non-metallic atoms necessary to complete a heterocyclic organic nucleus, such as an oxazole nucleus (e. g. 4-methyl oxazole, 4-phenyloxazole, benzoxazole or naphthoxazole), a thiazole nucleus (e. g. 4-methyl thiazole, 4-phenylthiazole benzothiazole, 5-chlorobenzothiazole and naphthothiazole), a selenazole nucleus (e. g. 4-methyl selenazole, 4-phenylselenazole or benzoselenazole), a thiazoline nucleus, a pyridine nucleus or a quinoline nucleus.

It is also known that merocyanine dyes of the above formula can be treated with alkyl salts (esters) to yield quaternary salt dyes of the following formula:

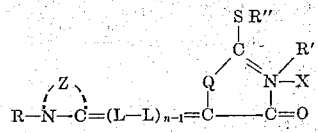

wherein $n$, L, Q, R, R' and Z have the values designated above, R" represents an alkyl group and X represents an acid radical.

We have now found that treatment of the above quaternary salt dyes with metal selenides produces merocyanine dyes containing selenocarbonyl groups and having the following formula:

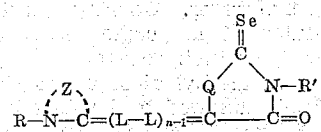

wherein $n$, L, Q, R, R' and Z have the values set forth above.

As metal selenides, we have found alkali metal selenides, especially sodium selenide, are advantageously employed. We have found that the treatment with the metal selenides is advantageously accomplished in the presence of a diluent which may be a solvent for the reactants. We have found that lower aliphatic alcohols i. e. alcohols of the formula:

$$C_nH_{2n+1}OH$$

wherein $n$ represents a positive integer of from 1 to 4, are especially suitable as a medium in which to effect the treatment. Heat accelerates the reaction.

The following examples will serve to illustrate our invention. These examples are not intended to limit our invention.

EXAMPLE 1.—3-ethyl-5-(3-ethyl-2(3)-benzothiazolylidene)-2-seleno-2,4(3,5)-thiazoledione

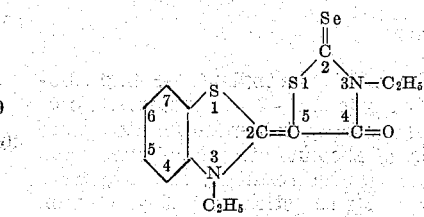

4.64 g. (1 mol.) of 5-(3-ethyl-2(3)-benzothiazolylidene)-2-methyl mercapto-4(5)-thiazolone ethiodide were suspended in 50 cc. of absolute ethyl alcohol at a temperature of from 20° to 25° C. To the resulting suspension were added rapidly and with stirring 2.5 g. (1 mol. plus 100% excess) of powdered sodium selenide dissolved in 20 cc. of water. Stirring was continued for five minutes. The seleno carbonyl merocyanine dye separated out at once as a yellow solid. The reaction mixture was chilled and the dye collected on a filter. The dye was washed with methyl alcohol and then with water and finally allowed to dry in the air. The yield of yellow crystals thus obtained was 3.5 g., 95%. After recrystallization from pyridine (27 cc. per gram of dye), the dye was obtained as felted yellow crystals melting with decomposition at 248° to 251° C. The yield was 2.8 g., 76%.

EXAMPLE 2.—3-ethyl-5-[(3-ethyl-2(3)-benzoxazolylidene) ethylidene]-2-seleno-2,4(3,5)-thiazoledione

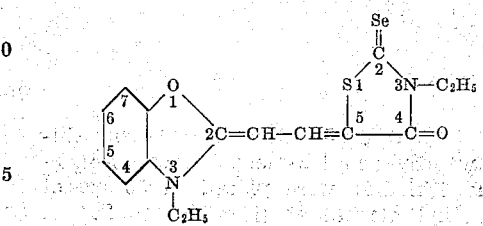

4.7 g. (1 mol.) of 5-[(3-ethyl-2(3)-benzoxazolylidene) ethylidene] - 2 - methylmercapto - 4(5)-thiazolone etho-ethylsulfate, were suspended in 25 cc. of absolute ethyl alcohol at from 20° to 25° C. To the resulting suspension were added rapidly and with stirring 2.5 g. (1 mol. plus 100% excess) of powdered sodium selenide dissolved in 20 cc. of water. Stirring was continued for five minutes. The seleno carbonyl merocyanine dye separated out as a red solid. The reaction mixture was chilled and the dye was collected on a filter. The dye was washed with methyl alcohol and then with water and finally allowed to dry in the air. In this manner 3.7 g. of red crystals (98% yield) were obtained. After recrystallization from pyridine (17 cc. per gram of dye), the dye was obtained as minute red crystals having a silver reflex and melting with decomposition at 248° to 250° C. The yield was 2.4 g., 82%.

EXAMPLE 3.—3 - ethyl - 5-[(1-ethyl-2(1)-β-naphthothiazolylidene) ethylidene] - 2 - seleno - 2,4(3,5)-thiazoledione

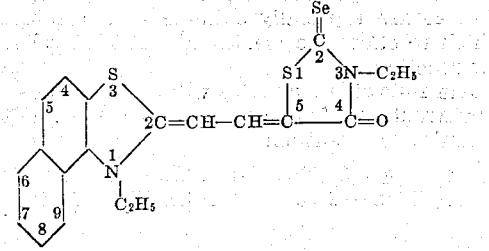

2.9 g. (1 mol.) of 5-[(1-ethyl-2(1)-β-naphthothiazolylidene) ethylidene] - 2 - methylmercapto-4(5)-thiazolone etho-p-toluenesulfonate were placed in 50 cc. of absolute ethyl alcohol at from 20° to 25° C. To the resulting mixture were added rapidly and with stirring 1.25 g. (1 mol. plus 100% excess) of sodium selenide dissolved in 20 cc. of water. Stirring was continued for five minutes. The seleno carbonyl merocyanine dye separated out as a green solid. The reaction mixture was chilled and the dye was collected on a filter. The dye was washed with methyl alcohol and then with water and finally allowed to dry in the air. In this manner 2.1 g. (95% yield) of green crystals were obtained. After recrystallization from pyridine (110 cc. per gram of dye), the dye was obtained as green crystals melting with decomposition at 268° to 270° C. The yield was 1.8 g., 80%.

EXAMPLE 4.—3 - ethyl-5-[(3-ethyl -2(3) - benzothiazolylidene) ethylidene]-2-seleno - 2,4(3,5)-thiazoledione

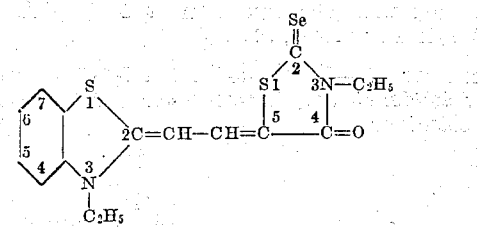

4.9 g. (1 mol.) of 5-[(3-ethyl-2(3)-benzothiazolylidene) ethylidene]-2-methylmercapto-4(5)-thiazolone ethiodide were placed in 50 cc. of absolute ethyl alcohol at from 20° to 25° C. To the resulting mixture were added rapidly and with stirring 2.5 g. (1 mol. plus 100% excess) of sodium selenide dissolved in 20 cc. of water. Stirring was continued for five minutes. The purple seleno carbonyl merocyanine dye which separated out was filtered off, washed with methyl alcohol and then with water and finally allowed to dry in the air. In this manner 3.6 g. (91% yield) of purple crystals were obtained. After recrystallization from pyridine (70 cc. per gram of dye), the dye was obtained as dull blue-black crystals melting with decomposition at 274° to 276° C. The yield was 2.9 g., 73%.

EXAMPLE 5.—3-ethyl-5-[(1-ethyl-2(1)-quinolylidene) ethylidene] -2- seleno - 2,4(3,5)-thiazoledione

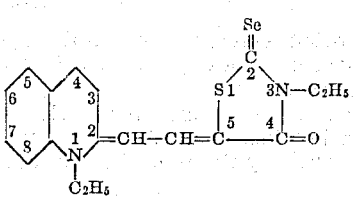

4.3 g. (1 mol.) of 5-[(1-ethyl-2(1)-quinolylidene) ethylidene] - 2 - methylmercapto-4(5)-thiazolone ethiodide were placed in 50 cc. of absolute ethyl alcohol. To the resulting mixture were added rapidly and with stirring 2.5 g. (1 mol. plus 100% excess) of sodium selenide dissolved in 20 cc. of water. Stirring was continued for five minutes. The seleno carbonyl merocyanine dye separated out as blue crystals. These crystals were collected on a filter, washed with methyl alcohol and then with water and finally dried in the air. In this manner 3 g. (77% yield) of blue crystals were obtained. After recrystallization from pyridine (34 cc. per gram of dye) the dye was obtained as steel blue crystals melting with decomposition at 257° to 259° C. The yield was 2.2 g., 56%.

EXAMPLE 6.—3-ethyl-5-[(3-ethyl-2(3)-benzothiazolylidene) isopropylidene]-2-seleno-2,4(3,5)-thiazoledione

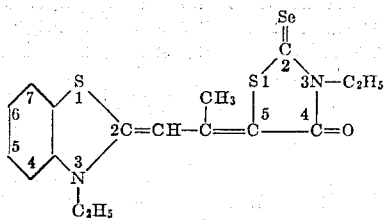

4.4 g. (1 mol.) of 5-[(3-ethyl-2(3)-benzothiazoylidene) isopropylidene] - 2 - methylmercapto-4(5)-thiazolone ethiodide were placed in 50 cc. of absolute ethyl alcohol. To the resulting mixture were added rapidly and with stirring 2.2 g. (1 mol. plus 100% excess) of sodium selenide dissolved in 20 cc. of water. Stirring was continued for five minutes. The purple seleno carbonyl merocyanine dye which separated was filtered off, washed with methyl alcohol and then with water and finally allowed to dry in the air. In this manner 3.3 g. (93% yield) of purple crystals were obtained. After recrystallization from pyridine (53 cc. per gram of dye), the dye was obtained as green crystals melting with decomposition at 230° to 233° C. The yield was 1.8 g., 50%.

EXAMPLE 6A

In a similar manner the corresponding α-ethyl ethylidene dye (wherein an ethyl group replaces the methyl group in the above formula) was obtained, in 62% yield, as blue needles melting with decomposition at 190° to 192° C.

EXAMPLE 7.—*3-ethyl-5-[(1-ethyl-2(1)-β-naphthothiazolylidene)-α-ethylethylidene]-2-seleno-2,4(3,5)-thiazoledione*

3.0 g. (1 mol.) of 5-[(1-ethyl-2(1)-β-naphthothiazolylidene)-α-ethylethylidene]-2-methylmercapto-4(5)-thiazolone etho-p-toluene sulfonate were placed in 50 cc. of absolute ethyl alcohol. To the resulting mixture were added rapidly and with stirring 1.25 g. (1 mol. plus 100% excess) of sodium selenide dissolved in 20 cc. of water. Stirring was continued for five minutes. The green seleno carbonyl merocyanine dye which separated out was collected on a filter, washed with methyl alcohol and then with water and finally allowed to dry in the air. In this manner 2.3 g. of green crystals (97% yield) were obtained. After recrystallization from pyridine (100 cc. per gram of dye) the dye was obtained as a dark powder melting with decomposition at 237° to 239° C. The yield was 1.3 g., 55%.

EXAMPLE 8.—*5 - [(3 - ethyl - 2(3) - benzoxazolylidene) ethylidene] - 3 - phenyl - 2 - seleno - 2,4(3,5) - thiazoledione*

7.6 g. (1 mol.) of 5-[(3-ethyl-2(3)-benzoxazolylidene)ethylidene]-3-phenylrhodanine and 7.4 g. (1 mol. plus 100% excess) of methyl-p-toluene sulfonate were heated together for about thirty minutes, in an oil bath at 140° C. to 145° C. The resulting crystalline product was cooled and washed by decantation with 100 cc. of diethyl ether. The washed product was dissolved in 100 cc. of absolute ethyl alcohol. To the resulting solution were added rapidly and with stirring 5 g. (1 mol. plus 100% excess) of sodium selenide in 25 cc. of water. Stirring was continued for thirty minutes. The red seleno carbonyl merocyanine dye which precipitated was filtered off, washed with water and then with methyl alcohol and allowed to dry in the air. In this manner 6.6 g. of orange crystals (80% yield) were obtained. After recrystallization from pridine (66 cc. per gram of dye), the dye was obtained as minute dark red crystals melting with decomposition at 245° to 247° C. The yield was 36%.

EXAMPLE 9.—*5 - [(3 - ethyl - 2(3) - benzoxazolylidene) ethylidene] - 1,3 - diphenyl - 2 - selenohydantoin*

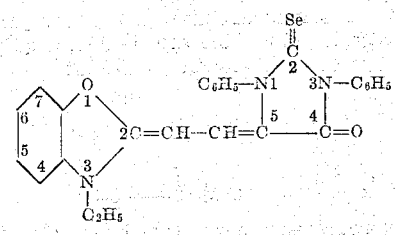

5.5 g. (1 mol.) of 5-[(3-ethyl-2(3)-benzoxazolylidene)ethylidene]-2-methylmercapto-1-phenyl-4(5)-imidazolone pheniodide were placed in 100 cc. of absolute alcohol. To the resulting mixture were added 2.3 g. (1 mol. plus 100% excess) of sodium selenide dissolved in about 25 cc. of water. The resulting mixture was stirred for about thirty minutes. The orange crystals of seleno carbonyl merocyanine dye which precipitated were filtered off, washed with water and then with methyl alcohol and finally allowed to dry in the air. In this manner, 3.8 g. (83% yield) of crystals were obtained. After recrystallizations from methyl alcohol (1300 cc. per gram of dye), the dye was obtained as red crystals melting with decomposition at 250° to 252° C.

The pheniodide employed above was prepared by heating 21.95 g. (1 mol.) of 5-[(3-ethyl-2(3)-benzoxazolylidene)ethylidene]-1,3-diphenyl-2-thiohydantoin and 10.2 g. (1 mol. plus 10% excess) of methyl-p-toluene sulfonate in 50 cc. of nitrobenzene for seventy-five minutes at 150° to 160° C. The red solution thus obtained was cooled and then diluted with 100 cc. of acetone. The pheniodide was precipitated by adding to the acetone solution 33 grams of potassium iodide dissolved in 100 cc. of water. The red pheniodide, which separated out, was filtered off with suction, washed with water and then with acetone and then finally dried in the air. The yield of red crystals was 13.4 g. (46%). After recrystallization from methyl alcohol, 10 cc. per gram of crystals, the pheniodide was obtained as red crystals melting with decomposition at 138 to 140° C. (Yield 32%).

EXAMPLE 10.—*3-ethyl-5-[(3-ethyl - 2(3) -benzoxazolylidene)ethylidene]-1-phenyl-2-selenohydantoin*

This dye was prepared in the same manner as that given in Example 9, using 5.3 g. (1 mol.) of 5-[(3- ethyl - 2(3) - benzoxazolylidene) - ethylidene] - 2-methylmercapto-1-phenyl-4(5) - imidazolone ethiodide, 2.5 g. (1 mol. plus 100% excess) of sodium selenide and 100 cc. of absolute ethyl alcohol. The yield of orange crystals was 4.3 g., 98%. After recrystallization from pyridine (33 cc. per gram of dye) the dye was obtained as minute red crystals melting with decomposition at 273° to 275° C. The yield was 2.4 g., 55%.

The ethiodide used in this example was prepared in the same manner as the pheniodide in Example 9. It was obtained as red crystals melting at 247° to 249° C. with decomposition.

In a manner similar to that illustrated in the above examples 3 - ethyl - 5 - [(3-phenyl-2(3) -benzothiazolylidene) - ethylidene] - 2 - seleno-2,4(3,5)-thiazoledione can be prepared from 3-ethyl-5-[(3-phenyl - 2(3) - benzothiazolylidene)-ethylidene]-rhodanine, the preparation of which is described in the copending application of L. G. S. Brooker and W. W. Williams, Serial No. 353,500, filed August 21, 1940. According to Brooker and Williams, 3-ethyl-5-[(3-phenyl-2(3) - benzothiazolylidene) ethylidene] - rhodanine is prepared by condensing, in the presence of triethylamine, 2 - (ω - acetanilidovinyl) - 3 - phenylbenzothiazolium iodide with 3-ethylrhodanine. The 2-(ω-acetanilidovinyl)-3-phenylbenzothiazolium iodide is prepared, as described by Brooker and Williams, by condensing 2-methyl-3-phenylbenzothiazolium iodide with diphenylformamidine, in the presence of acetic anhydride. The 2-methyl-3-phenylbenzothiazolium iodide is prepared, as described by Brooker and Williams, by hydrolyzing, in the presence of hydrochloric acid, 2-dicarbethoxymethylene-3-phenylbenzothiazoline.

Also in a manner similar to that illustrated in the above examples, 3-ethyl-5-[(3,4-trimethylene - 2(3) - benzothiazolylidene)ethylidene] - 2 - seleno-2(3,5)-thiazoledione can be prepared from 3-ethyl-5-[(3,4-trimethylene-2(3)-benzothiazolylidene)ethylidene]-rhodanine, the preparation of which is described by L. G. S. Brooker and H. W. J. Cressman, Serial No. 353,502, filed August 21, 1940 (now United States Patent 2,317,357, issued April 27, 1943). The 3-ethyl-5-[(3,4-trimethylene-2(3)-benzothiazolylidene)ethylidene]-rhodanine can be prepared, according to Brooker and Cressman, by condensing, in the presence of triethylamine, 5-acetanilido-methylene-3-ethylrhodanine with 2-methyl-3,4-trimethylene benzothiazolium iodide. The 2-methyl-3,4-trimethylenebenzothiazolium iodide is prepared, according to Brooker and Cressman, by oxidizing, with iodine, 1-thioacetyl-1,2,3,4-tetrahydroquinoline.

We have found that our new dyes spectrally sensitize photographic silver halide emulsions when incorporated therein. The dyes are especially useful for extending the spectral sensitivity of the customarily employed gelatino-silver-chloride, -bromide, and -bromiodide developing-out emulsions. To prepare emulsions sensitized with our new dyes, it is only necessary to disperse the dyes in the emulsions. The methods of incorporating dyes in emulsions are simple and well known to those skilled in the art. In practice, it is convenient to add the dyes to the emulsions in the form of a solution in an appropriate solvent. Methanol has been proven satisfactory as a solvent for our new dyes. The dyes are advantageously incorporated in the finished, washed emulsions and should be uniformly distributed throughout the emulsions.

The concentration of the dyes in the emulsion can vary widely, e. g., from 5 to about 100 mg. per liter of flowable emulsion. The concentration of the dye will vary according to the type of the emulsion and according to the effects desired. The suitable and most economical concentration for any given emulsion will be apparent to those skilled in the art, upon making the ordinary tests and observations customarily used in the art of emulsion making. To prepare a gelatino-silver-halide emulsion sensitized with our new dyes, the following procedure is satisfactory. A quantity of dye is dissolved in methyl alcohol or acetone and a volume of this solution, which may be diluted with water, containing from 5 to 100 mg. of dye is slowly added to about 1000 cc. of a gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiodide emulsion (containing about 40 g. of silver halide) suffice to produce the maximum sensitizing effect. With the finer grain emulsions which include most of the ordinarily employed gelatino-silver-chloride emulsions, somewhat larger concentrations of dye may be needed to produce the maximum sensitizing effect.

The above statements are only illustrative as it will be apparent that the dyes can be incorporated in photographic emulsions by any of the other methods customarily employed in the art; e. g. by bathing a plate or film upon which an emulsion is coated in a solution of the dye in an appropriate solvent. However, bathing methods are ordinarily not to be preferred. Emulsions sensitized with the dyes can be coated on suitable supports such as glass, cellulose derivative film, resin film or paper, in the usual manner.

The following table sets forth the sensitizing action of the dyes given in the several examples. The absorption of the methyl alcoholic solutions of the dyes is also given.

| Dye | Emulsion | Sensitizing action | Absorption maximum or visual color of methyl alcohol solution |
|---|---|---|---|
| Example 1 | Gelatino-silver-chloride. | Weak to 510 mu, maximum 480 mu. | 447 mu. |
| Example 2 | Gelatino-silver-bromiodide. | Strong to 610 mu, maximum 565 mu. | 516 mu. |
| Example 3 | do | Strong from 540 mu to 720 mu, maximum 660 mu. | 589 mu. |
| Example 4 | do | Strong to 650 mu, maximum 600 mu. | 547 mu. |
| Example 5 | do | Strong to 670 mu, maximum 620 mu. | 581 mu. |
| Example 6 | do | Fair to 630 mu, maximum 590 mu. | Pink. |
| Example 6a | do | Strong to 640 mu, maximum 600 mu. | 555 mu. |
| Example 7 | do | Strong to 690 mu, maximum 620 mu. | Bluish red. |
| Example 8 | do | Fair to 610 mu, maximum 560 mu. | Pink. |
| Example 9 | do | Fair to 570 mu, maximum 525 mu. | Pinkish orange. |
| Example 10 | do | Strong to 570 mu, maximum 530 mu. | Orange. |

What we claim as our invention and desire to be secured by Letters Patent of the United States is:

1. A process for preparing a merocyanine dye containing a selenocarbonyl group comprising treating with a metal selenide, a quaternary salt dye of the following formula:

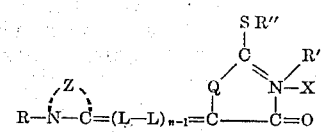

wherein $n$ represents a positive integer of from one to two, L represents a methine group, Q represents a member selected from the group consisting of sulfur, alkylimino and arylimino groups, R and R' each represent a member selected from the group consisting of alkyl and aryl groups, X represents an acid radical and Z represents the non-metallic atoms necessary to complete a heterocyclic organic nucleus.

2. A process for preparing a merocyanine dye containing a selenocarbonyl group comprising treating with an alkali metal selenide, a quaternary salt dye of the following formula:

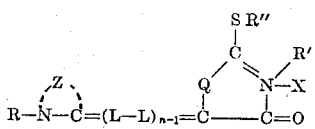

wherein $n$ represents a positive integer of from one to two, L represents a methine group, Q represents a member selected from the group consisting of sulfur, alkylimino and arylimino groups, R and R' each represent a member selected from the group consisting of alkyl and aryl groups, X represents an acid radical and Z represents the non-metallic atoms necessary to complete a heterocyclic organic nucleus.

3. A process for preparing a merocyanine dye containing a selenocarbonyl group comprising treating with sodium selenide, a quaternary salt dye of the following formula:

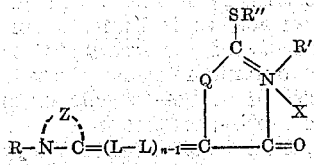

wherein n represents a positive integer of from one to two, L represents a methine group, Q represents a member selected from the group consisting of sulfur, alkylimino and arylimino groups, R and R' each represent a member selected from the group consisting of alkyl and aryl groups, X represents an acid radical and Z represents the non-metallic atoms necessary to complete a heterocyclic organic nucleus.

4. A process for preparing a merocyanine dye containing a selenocarbonyl group comprising treating with a metal selenide, a quaternary salt dye of the following formula:

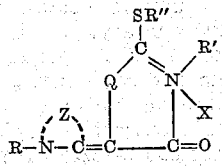

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus.

5. A process for preparing a merocyanine dye containing a selenocarbonyl group comprising treating with an alkali metal selenide, a quaternary salt dye of the following formula:

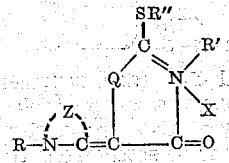

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus.

6. A process for preparing a merocyanine dye containing a selenocarbonyl group comprising treating with sodium selenide, a quaternary salt dye of the following formula:

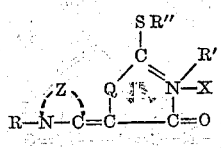

wherein R and R'' each represents an alkyl group, R' represents a member selected from the group consisting of alkyl and aryl groups, Q represents a member selected from the group consisting of sulfur, alkylamino and arylamino groups, X represents an acid radical and Z represents the non-metallic atoms necessary to complete a heterocyclic organic nucleus.

7. A process for preparing a merocyanine dye containing a selenocarbonyl group comprising treating with a metal selenide a quaternary salt dye of the following formula:

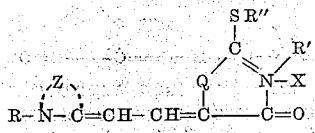

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus.

8. A process for preparing a merocyanine dye containing a selenocarbonyl group comprising treating with an alkali metal selenide, a quaternary salt dye of the following formula:

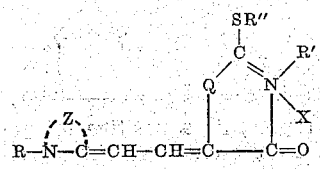

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus.

9. A process for preparing a merocyanine dye containing a selenocarbonyl group comprising treating with sodium selenide, a quaternary salt dye of the following formula:

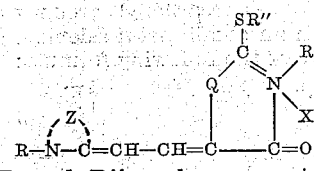

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus.

10. A process for preparing a merocyanine dye containing a selenocarbonyl group comprising treating with an alkali metal selenide a quaternary salt dye of the following formula:

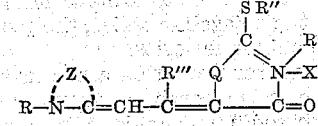

wherein R and R'' each represents an alkyl group, R' represents a member selected from the group consisting of alkyl and aryl groups, R''' represents an alkyl group, Q represents a member selected from the group consisting of sulfur, alkylimino groups and arylimino groups, X represents an acid radical and Z represents the non-metallic atoms necessary to complete a heterocyclic organic nucleus.

11. A process for preparing a merocyanine dye containing a selenocarbonyl group comprising teating with sodium selenide, a quaternary salt of the following formula:

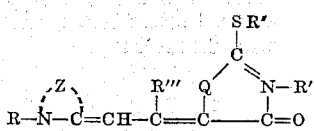

wherein R and R'' each represents an alkyl group, R' represents a member selected from the group consisting of alkyl and aryl groups, R''' represents an alkyl group, Q represents a member selected from the group consisting of sulfur, alkylimino and arylimino groups, and Z represents the non-metallic atoms necessary to complete a heterocyclic organic nucleus.

12. A process for preparing a merocyanine dye containing a selenocarbonyl group comprising treating with a metal selenide, a quaternary salt dye of the following formula:

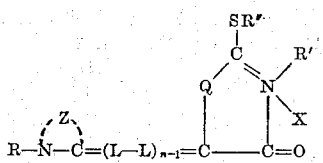

wherein $n$ represents a positive integer of from one to two, L represents a methine group, Q represents a member selected from the group consisting of sulfur, alkylimino and arylimino groups, R and R' each represent a member selected from the group consisting of alkyl and aryl groups, X represents an acid radical and Z represents the non-metallic atoms necessary to complete a heterocyclic organic nucleus selected from the group consisting of heterocyclic organic nuclei of the oxazole series, the thiazole series, the selenazole series, the thiazoline series, the pyridine series and the quinoline series.

13. A process for preparing a merocyanine dye containing a selenocarbonyl group comprising treating with an alkali metal selenide, a quaternary salt dye of the following formula:

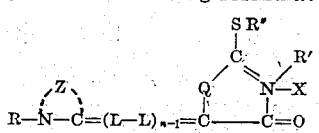

wherein $n$ represents a positive integer of from one to two, L represents a methine group, Q represents a member selected from the group consisting of sulfur, alkylimino and arylimino groups, R and R' each represents a member selected from the group consisting of alkyl and aryl groups, X represents an acid radical and Z represents the non-metallic atoms necessary to complete a heterocyclic organic nucleus selected from the group consisting of heterocyclic organic nuclei of the oxazole series, the thiazole series, the selenazole series, the thiazoline series, the pyridine series and the quinoline series.

14. A process for preparing a merocyanine dye containing a selenocarbonyl group comprising treating with sodium selenide, a quaternary salt dye of the following formula:

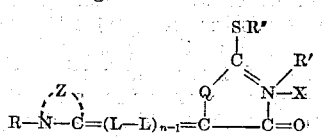

wherein $n$ represents a positive integer of from one to two, L represents a methine group, Q represents a member selected from the group consisting of sulfur, alkylimino and arylimino groups, R and R' each represents a member selected from the group consisting of alkyl and aryl groups, X represents an acid radical and Z represents the non-metallic atoms necessary to complete a heterocyclic organic nucleus selected from the group consisting of heterocyclic organic nuclei of the oxazole series, the thiazole series, the selenazole series, the thiazoline series, the pyridine series and the quinoline series.

15. A process for preparing a merocyanine dye containing a selenocarbonyl group comprising treating with a metal selenide, a quaternary salt dye of the following formula:

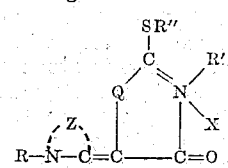

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus selected from the group consisting of heterocyclic organic nuclei of the oxazole series, the thiazole series, the selenazole series, the thiazoline series, the pyridine series and the quinoline series.

16. A process for preparing a merocyanine dye containing a selenocarbonyl group comprising treating with an alkali metal selenide, a quaternary salt dye of the following formula:

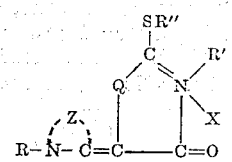

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus selected from the group consisting of heterocyclic organic nuclei of the oxazole series, the thiazole series, the selenazole series, the thiazoline series, the pyridine series and the quinoline series.

17. A process for preparing a merocyanine dye containing a selenocarbonyl group comprising treating with sodium selenide, a quaternary salt dye of the following formula:

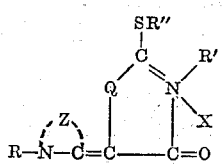

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus selected from the group consisting of heterocyclic organic nuclei of the oxazole series, the thiazole series, the selenazole series, the thiazoline series, the pyridine series and the quinoline series.

18. A process for preparing a merocyanine dye containing a selenocarbonyl group comprising treating with a metal selenide a quaternary salt dye of the following formula:

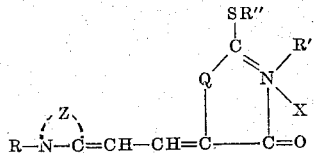

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus selected from the group consisting of heterocyclic organic nuclei of the oxazole series, the thiazole series, the selenazole series, the thiazoline series, the pyridine series and the quinoline series.

19. A process for preparing a merocyanine dye containing a selenocarbonyl group comprising treating with an alkali metal selenide, a quaternary salt dye of the following formula:

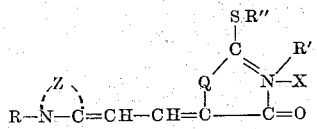

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus selected from the group consisting of heterocyclic organic nuclei of the oxazole series, the thiazole series, the selenazole series, the thiazoline series, the pyridine series and the quinoline series.

20. A process for preparing a merocyanine dye containing a selenocarbonyl group comprising treating with sodium selenide, a quaternary salt dye of the following formula:

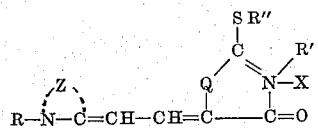

wherein R and R'' each represents an alkyl group, R' represents a member selected from the group consisting of alkyl and aryl groups, Q represents a member selected from the group consisting of sulfur, alkylimino and arylimino groups, X represents an acid radical and Z represents the non-metallic atoms necessary to complete a heterocyclic organic nucleus selected from the group consisting of heterocyclic organic nuclei of the oxazole series, the thiazole series, the selenazole series, the thiazoline series, the pyridine series and the quinoline series.

21. A process for preparing a merocyanine dye containing a selenocarbonyl group comprising treating with an alkali metal selenide a quaternary salt dye of the following formula:

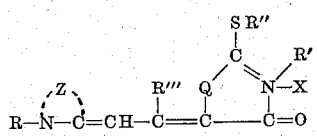

wherein R and R'' each represents an alkyl group, R' represents a member selected from the group consisting of alkyl and aryl groups, R''' represents an alkyl group, Q represents a member selected from the group consisting of sulfur, alkylimino groups and arylimino groups, X represents an acid radical and Z represents the non-metallic atoms necessary to complete a heterocyclic organic nucleus selected from the group consisting of heterocyclic organic nuclei of the oxazole series, the thiazole series, the selenazole series, the thiazoline series, the pyridine series and the quinoline series.

LESLIE G. S. BROOKER.
ROBERT H. SPRAGUE.

CERTIFICATE OF CORRECTION.

Patent No. 2,332,433. October 19, 1943.

LESLIE G. S. BROOKER, ET AL.

It is hereby certified that error appears in the printed specification of the above numbered patent requiring correction as follows: Page 4, first column, line 1, for "seleno-2(3,5)-" read -- seleno-2,4(3,5)- --; and second column, line 34, in the table, for "530 mu." read --535 mu.--; and that the said Letters Patent should be read with this correction therein that the same may conform to the record of the case in the Patent Office.

Signed and sealed this 25th day of January, A. D. 1944.

(Seal)

Henry Van Arsdale,
Acting Commissioner of Patents.